United States Patent
Kudo

(10) Patent No.: US 9,008,463 B2
(45) Date of Patent: Apr. 14, 2015

(54) IMAGE EXPANSION APPARATUS FOR PERFORMING INTERPOLATION PROCESSING ON INPUT IMAGE DATA, AND IMAGE EXPANSION METHOD THEREOF

(71) Applicant: Kabushiki Kaisha Toshiba, Minato-ku, Tokyo (JP)

(72) Inventor: Tsukasa Kudo, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 60 days.

(21) Appl. No.: 13/779,732

(22) Filed: Feb. 27, 2013

(65) Prior Publication Data
US 2013/0243353 A1 Sep. 19, 2013

(51) Int. Cl.
*G06K 9/32* (2006.01)
*G06T 3/40* (2006.01)
*G06K 9/00* (2006.01)

(52) U.S. Cl.
CPC ................... *G06T 3/4007* (2013.01)

(58) Field of Classification Search
CPC ........ G06T 3/4007; G06T 3/403; G06T 3/001
USPC ......... 382/203, 218–220, 254, 255, 270, 276, 382/299–300; 348/65, 448, 452, 458, 807; 345/467, 606, 660, 667, 699
See application file for complete search history.

(56) References Cited

U.S. PATENT DOCUMENTS

| | | | | |
|---|---|---|---|---|
| 5,532,765 A * | 7/1996 | Inoue et al. | ............... | 348/807 |
| 6,980,254 B1 * | 12/2005 | Nishihashi et al. | ........... | 348/452 |
| 7,346,231 B2 * | 3/2008 | Okuno et al. | ............. | 382/300 |
| 7,443,400 B2 * | 10/2008 | Matskewich et al. | ......... | 345/467 |
| 2013/0243353 A1 * | 9/2013 | Kudo | ..................... | 382/300 |

FOREIGN PATENT DOCUMENTS

| | | |
|---|---|---|
| JP | 2000-228723 A | 8/2000 |
| JP | 2004-207923 A | 7/2004 |
| JP | 2009-094751 A | 4/2009 |

* cited by examiner

*Primary Examiner* — Amir Alavi
(74) *Attorney, Agent, or Firm* — Holtz, Holtz, Goodman & Chick PC

(57) ABSTRACT

An image expansion apparatus includes a second order differential circuit, a multi-valued processing unit, a first determination unit, a selection unit, and an interpolation processing unit. The first determination unit compares respectively a plurality of fixed patterns, which is each assigned with an interpolation direction in accordance with an outline shape of an image, with spatial dispersion of an output of the multi-valued processing unit. The first determination unit determines a fixed pattern corresponding to the output. The first determination unit determines an interpolation direction assigned to the fixed pattern as a candidate of an interpolation direction for the outline shape. The selection unit selects an interpolation direction of a plurality of candidates of the interpolation direction for the outline shape. The interpolation processing unit generates an interpolation pixel to determine the pixel for the interpolation based on the interpolation direction selected by the selection unit.

19 Claims, 14 Drawing Sheets

I (0, 0)

I (1, 0)

I (2, 0)

I (0, 1)

I (1, 1)

I (2, 1)

I (0, 2)

I (1, 2)

I (2, 2)

O(0, 0)   O(1, 0)   O(2, 0)   O(3, 0)   O(4, 0)

O(0, 1)   O(1, 1)   O(2, 1)   O(3, 1)   O(4, 1)

O(0, 2)   O(1, 2)   O(2, 2)   O(3, 2)   O(4, 2)

O(0, 3)   O(1, 3)   O(2, 3)   O(3, 3)   O(4, 3)

O(0, 4)   O(1, 4)   O(2, 4)   O(3, 4)   O(4, 4)

IMAGE EXPANSION APPARATUS FOR PERFORMING INTERPOLATION PROCESSING ON INPUT IMAGE DATA, AND IMAGE EXPANSION METHOD THEREOF

CROSS REFERENCE TO RELATED APPLICATION

This application is based upon and claims the benefit of priority from the prior Japanese Patent Application No. 2012-057650, filed on Mar. 14, 2012, the entire contents of which are incorporated herein by reference.

FIELD

Embodiments described herein relate to an image expansion apparatus and an image expansion method.

BACKGROUND

In recent years, a display apparatus has acquired higher resolution with requirements toward high image quality. The high-resolution display apparatus sometimes receives relatively low-resolution image data. A picture image of the low-resolution image data is displayed on screens of the high-resolution display apparatus, and is comparatively small. The apparatus sometimes performs expansion processing of an input image.

Heretofore, in the display apparatus, a pixel interpolation technology as image expansion processing is used. The pixel interpolation interpolates a pixel value lacked in an input image by using pixel values around the pixel value, e.g., by using an FIR (Finite Impulse Response) filter.

However, pictures generated by the expansion processing using the pixel interpolation technology are rough around diagonal lines. So-called "jaggy" may become prominent in the image.

DETAILED DESCRIPTION

Figure 1:
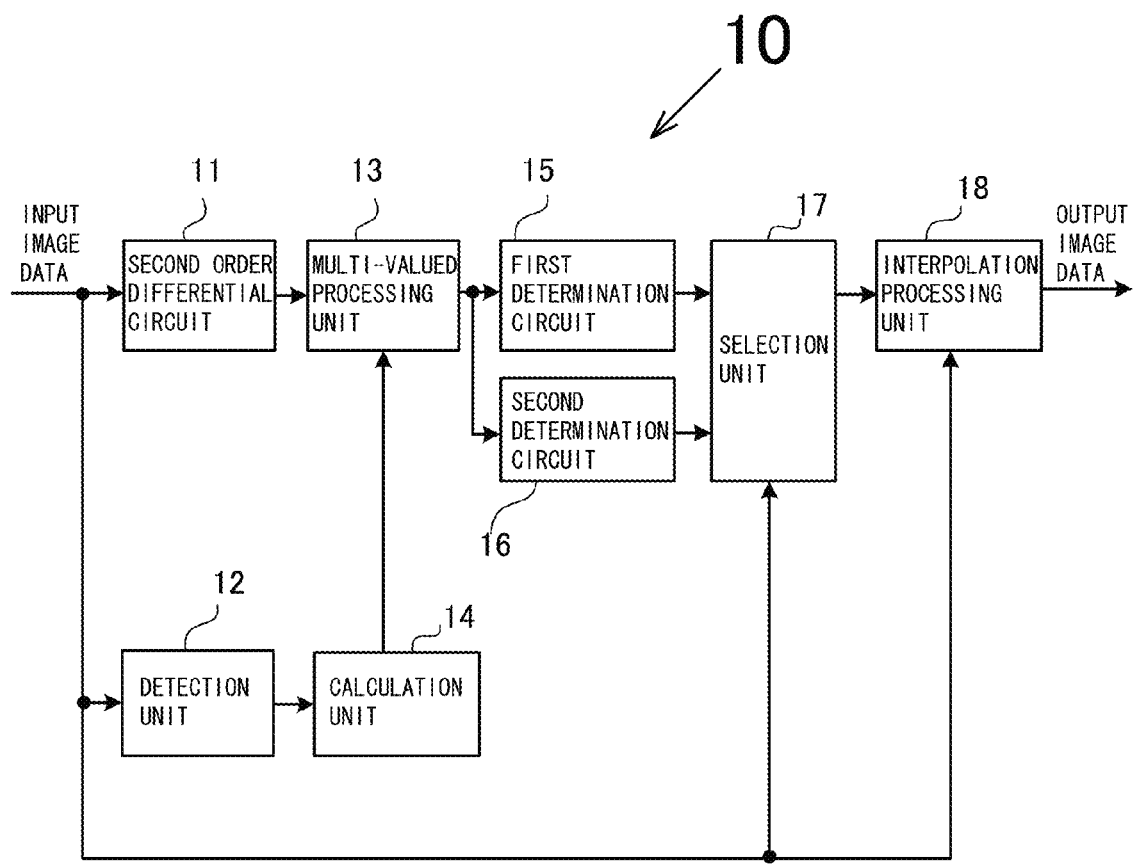
FIG. 1 is a block diagram showing an image expansion apparatus according to a first embodiment.

According to an embodiment, an image expansion apparatus includes a second order differential circuit, a multi-valued processing unit, a first determination unit, a selection unit, and an interpolation processing unit. The second order differential circuit spatially performs second order differential processing to input image data. The multi-valued processing unit performs multi-valued processing to an output of the second order differential circuit. The first determination unit compares respectively a plurality of fixed patterns, which is each assigned with an interpolation direction in accordance with an outline shape of an image, with spatial dispersion of an output of the multi-valued processing unit, determines a fixed pattern corresponding to the output from the multi-valued processing unit, and determines an interpolation direction assigned to the fixed pattern as a candidate of an interpolation direction for the outline shape. The selection unit selects an interpolation direction from a plurality of candidates of the interpolation direction for the outline shape. The interpolation processing unit receives the input image data, and generates an interpolation pixel to determine the pixel for the interpolation based on the interpolation direction selected by the selection unit.

Hereinafter, embodiments will be described with reference to the drawings. In the drawings, the same reference numerals denote the same or similar portions.

A first embodiment will be described with reference to the drawings. FIG. 1 is a block diagram showing an image expansion apparatus according to the first embodiment.

In the embodiment, expansion processing is performed by using pixel interpolation technology. The pixel interpolation technology of the embodiment generates an interpolation pixel by operation of using a plurality of pixels that is present along the outline of a continuous picture, i.e., in the interpolation direction. An outline is determined by detecting an edge of the picture. The embodiment prepares a plurality of fixed patterns, which is preliminarily assumed as outline shapes, to determine one fixed pattern that fits the pattern of an input image, so that the embodiment determines an interpolation direction for interpolating a pixel.

First, jaggies caused by expansion processing will be described with reference to FIGS. 2 to 5.

Figure 2:
FIG. 2 is a view showing 3×3 pixels in an image by circles.
Figure 2:
Figure 2:
Figure 2:
Figure 2:
Figure 2:
Figure 2:
Figure 2:
Figure 2:

FIG. 2 is a view showing 3×3 pixels in an image by circles. A location of each pixel is denoted by (m, n). The numerals m and n denote the numbers of pixels including the pixel in the horizontal direction and the vertical direction, respectively. A pixel value at the pixel location (m, n) is assumed to be I (m, n).

Figure 3:
FIG. 3 is a view showing sample locations of output-image data in a pixel range defined in FIG. 2 when the input image data is twice expanded in the horizontal and vertical directions.
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:

FIG. 3 is a view showing sample locations of output-image data in a pixel range defined in FIG. 2 when the input image data is twice expanded in the horizontal and vertical directions. The pixel location (m, n) in FIG. 2 and the pixel location (2m, 2n) in FIG. 3 denote the same location.

Theretofore, when typical expansion processing employs respective 4-tap FIR filters in the horizontal and vertical directions, pixel values of the output-image data are expressed by the following equation. In the equation, I(m, n) denotes a pixel value at a pixel location (m, n) of an input image, and O(m, n) denotes a pixel value at a pixel location (m, n) of an output image.

The equation is specified as:

$$O(2m,2n)=I(m,n);$$

$$O(2m+1,2n)=-0.125I(m-1,n)+0.625I(m,n)+0.625I(m+1,n)-0.125I(m+2,n);$$

Figure 4:
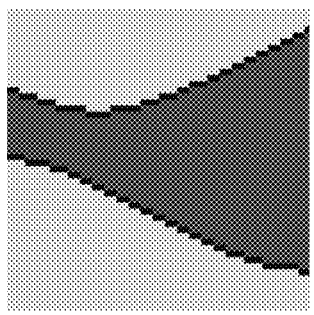
FIG. 4 is a view showing an example of an input image.
Figure 5:
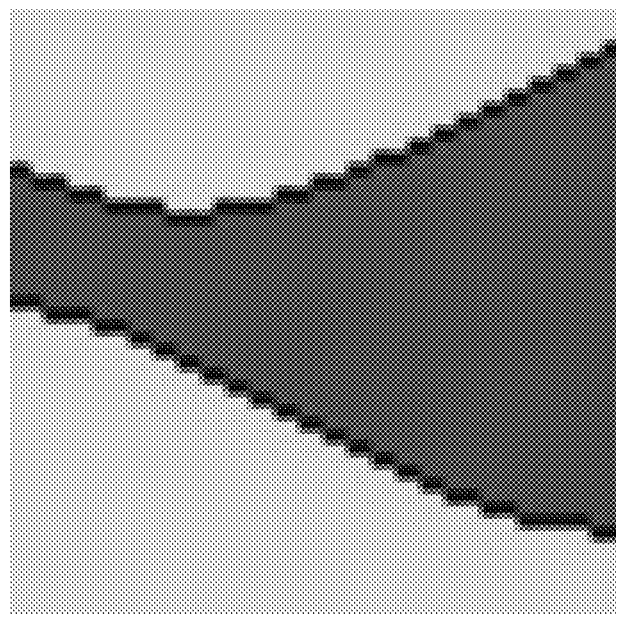
FIG. 5 is a view showing an output image when the input image is twice expanded both in the horizontal and vertical directions.

$O(2m,2n+1) = -0.125I(m,n-1)+0.625I(m,n)+0.625I(m,n+1)-0.125I(m,n+2);$ and $O(2m+1,2n+1)=0.015625I(m-1,n-1)-0.078125I(m,n-1)-0.078125I(m+1,n-1)+0.015625I(m+2,n-1)-0.078125I(m-1,n)+0.390625I(m,n)+0.390625I(m+1,n)-0.078125I(m+2,n)-0.078125I(m-1,n+1)+0.390625I(m,n+1)+0.390625I(m+1,n+1)-0.078125I(m+2,n+1)-0.015625I(m-1,n+2)-0.078125I(m,n+2)-0.078125I(m+1,n+2)+0.015625I(m+2,n+2).$ FIG. 4 is a view showing an example of an input image. FIG. 5 is a view showing an output image when the input image is twice expanded both in the horizontal and vertical directions. As shown in FIG. 5, in the expansion processing by using a FIR filter, jaggies appear on the diagonal line. Therefore, pictures are rough the diagonal lines.

As shown in the above formula, the FIR filter determines a pixel value of an interpolation pixel by using pixels around the interpolation pixel. In contrast, the embodiment detects the outline of a picture to determine an interpolation direction by comparing a detected outline with fixed patterns, thereby calculating a pixel value of the interpolation pixel. The operation of the embodiment is configured to prevent the jaggy.

As shown in FIG. 1, an image expansion apparatus 10 includes a second order differential circuit 11, a detection unit 12, a multi-valued processing unit 13, a calculation unit 14, a first determination unit 15, a second determination unit 16, a selection unit 17, and an interpolation processing unit 18. As shown in FIG. 1, input image data to be inputted into the image expansion apparatus 10 is provided for the second order differential circuit 11 and the detection unit 12. The second order differential circuit 11 detects an edge by spatially performing second order differential processing. The second order differential circuit 11 detects the edge by using a second order differential value in at least one of the horizontal, vertical, and diagonal directions.

For example, the second order differential circuit 11 uses the additional value of second order differential values in the horizontal, vertical, diagonal up-right, and diagonal up-left directions as an edge detection result. The edge detection result detected by the second order differential circuit is expressed by the following equations (1) to (5), provided that the location of the noticeable pixel is (x, y), and a pixel value of the noticeable pixel is 1(x, y).

The equations are specified as:

Horizontal second order differential result$=(-I(x-1,y)+2I(x,y)-I(x+1,y))/4$ (1);

Vertical second order differential result$=(-I(x,y-1)+2I(x,y)-I(x,y+1))/4;$ (2);

Diagonal left-up second order differential result$=(-I(x-1,y-1)+2I(x,y)-I(x+1,y+1))/4;$ (3);

Diagonal right-up second order differential result$=(-I(x+1,y-1)+2I(x,y)-I(x-1,y+1))/4;$ (4); and Edge detection result=the horizontal second order differential result+the vertical second order differential result+the diagonal left-up second order differential result+the diagonal right-up second order differential result (5).

In the embodiment, one of the fixed patterns is selected by using the edge detection result. The output of the second order differential circuit 11 has resolution (bit number) in accordance with the configuration of the second order differential circuit 11. When the output of the second order differential circuit 11, as it is, is used for a selection of the fixed pattern, throughput of the subsequent circuits will increase enormously. For this reason, in the embodiment, the edge detection result of the second order differential circuit 11 is provided for the multi-valued processing unit 13 to perform 4-valued processing. A threshold value used for the 4-valued processing is changed with a dynamic range of an input image. Although the multi-valued processing unit 13 performs 4-valued processing, the multi-valued processing unit is not necessarily limited to the 4-valued processing.

The detection unit 12 receives input image data to determine a dynamic range, i.e., a difference between a maximum pixel value and a minimum pixel value around the noticeable pixel. For example, the detection unit 12 calculates the dynamic range of a pixel range of (3×3) pixels around the noticeable pixel (x, y) for the input image data by using the following equations (6) to (8).

The equations (6) to (8) are specified as:

Maximum Value=max$\{I(x-1,y-1),I(x,y-1),I(x+1,y-1),I(x-1,y),I(x,y),I(x+1,y),I(x-1,y+1),I(x,y+1),I(x+1,y+1)\}$ (6);

Minimum Value=min$\{I(x-1,y-1),I(x,y-1),I(x+1,y-1),I(x-1,y),I(x,y),I(x+1,y),I(x-1,y+1),I(x,y+1),I(x+1,y+1)\};$ and (7); and Dynamic Range=Maximum Value−Minimum Value. (8).

The calculation unit 14 receives an information on the dynamic range determined by the detection unit 12. The calculation unit 14 changes a 4-valued threshold value in accordance with the dynamic range. For example, the calculation unit 14 computes a threshold value tht from the dynamic range on the basis of the following equation (9). In addition, $\alpha$ and $\beta$ are constants specified as adjusting parameters.

The equation (9) is defined as $tht=\alpha \times$Dynamic Range$+\beta$ ($\alpha$ and $\beta$ are positive real numbers) (9).

The larger the dynamic range, the larger the threshold value tht from the calculation unit 14. The calculation unit 14 provides the threshold value tht for the multi-valued processing unit 13. The multi-valued processing unit 13 compares an edge detection result with the threshold value tht to convert the edge detection result into 2-bit data by performing the 4-valued processing to the result.

The edge detection result due to second order differential processing continuously changes from positive to negative values at the edge. For example, the multi-valued processing unit 13 performs 4-valued processing to the edge detection result in accordance with the following Table 1.

TABLE 1

| | |
|---|---|
| 0 | more than tht |
| 1 | not less than 0 and not more than tht |
| 2 | not less than −tht and less than 0 |
| 3 | less than −tht |

The multi-valued processing unit 13 compares the edge detection result with the threshold value tht to check whether or not the noticeable pixel is located at the edge. The 4-valued output from the multi-valued processing unit 13 is likely to be 0 or 3 on Table 1 at an obvious edge. The threshold value tht is changed in accordance with a dynamic range. A comparatively large edge only is determined as existence of an edge when a dynamic range relatively large. Thereby, it is possible to obtain an edge detection result corresponding to a picture.

Alternatively, multi-valued processing may be applied to the threshold value in addition to the 4-valued processing. The embodiment preferably employs 3-or-more-valued processing.

Figure 6:
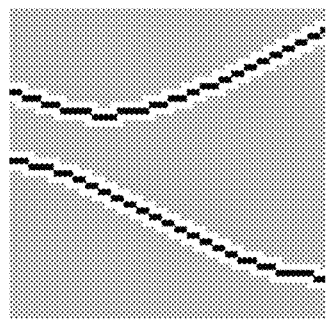
FIG. 6 is a view for explaining an output of a multi-valued processing unit corresponding to the input data in FIG. 4.

FIG. 6 is a view for explaining an output of the multi-valued processing unit 13 corresponding to the input data in FIG. 4. In FIG. 6, 4-valued 2-bit data is visually expressed by a grayscale with luminance (Y) of 8 bits. In FIG. 6, black portions correspond to the edge detection result with negative large value, and white portions correspond to the edge detection result with positive large value.

0→Y=255

1→Y=192

2→Y=64

3→Y=0

As shown in FIG. 6, the 4-valued edge detection result allows it to estimate a direction of the outline of the picture, i.e., an interpolation direction.

In the embodiment, a candidate of an interpolation direction is determined using a 2-bit edge detection result. The multi-valued processing unit 13 provides the 2-bit edge detection result for the first determination unit 15 and the second determination unit 16.

The first determination unit 15 reads out fixed patterns stored in a storage unit (not shown). A plurality of fixed patterns corresponding to the respective interpolation directions is memorized in the storage unit. The fixed patterns are to determine a changing state of the edge in a range with the predetermined number of pixels and continuity of the outline, and correspond to various interpolation directions. The first determination unit 15 determines which fixed pattern fits an edge detection result in accordance with input image data, and determines an interpolation direction corresponding to the fitted pattern as a candidate of an interpolation direction. Alternatively, the first determination unit 15 may use not only the fixed patterns to determine the interpolation direction but also a pattern with pixels of the pattern determined in the interpolation direction for the interpolation processing.

The first determination unit 15 compares the edge detection result in accordance with input image data with a comparison value of the fixed pattern for every pixel in the range with a predetermined number of pixels. The first determination unit 15 determines all the pixels, and assumes a fixed pattern having fitted values with regard to all pixels as candidates of the pattern in the interpolation direction.

In the embodiment, multiple values are used for a comparison value than the edge detection result. For example, the embodiment may employ an 8-valued comparison value for a 4-valued edge detection result. When the edge detection result due to second order differential processing sometimes includes a large positive value and a large negative value both being continuous, as a sharp edge of a common picture, the first determination unit 15 can detect the fixed pattern corresponding to the edge shape. In some edge detection results due to second order differential processing for natural pictures, however, a large positive value and a nearly zero value smoothly connect with each other at the edge, or a large negative value and a nearly zero value smoothly connect with each other at the edge. In this case, the image expansion apparatus of the embodiment is unlikely to detect a fixed pattern corresponding to the outline shape.

In the embodiment, comparing a 2-bit detection result with a 3-bit comparison value makes it easy for a comparison with every pixel to be determined as "true". Therefore, it is possible to detect various outline shapes of natural pictures.

Figure 7:
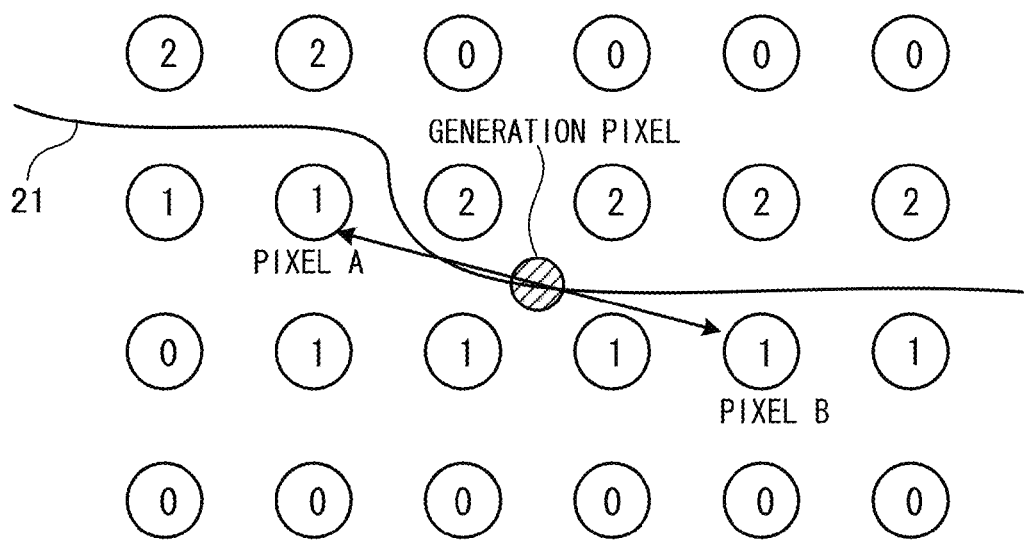
FIG. 7 is a view showing an example of a fixed pattern.

FIG. 7 is a view showing an example of a fixed pattern. In FIG. 7, the circles denote pixels, and the numbers inside the circles denote comparison values having been set for the respective pixels. The fixed pattern shown in FIG. 7 is used to detect an outline shape denoted by a solid line 21, and shows that a generation pixel as an interpolation pixel is located at the center between PIXEL A and PIXEL B both being used for the interpolation in the direction connecting PIXEL A and PIXEL B.

Such a fixed pattern is memorized for every outline shape to be detected in the storage unit of the first determination unit 15. Alternatively, the storage unit may memorize a plurality of patterns for the same interpolation direction or a plurality of patterns to result in the same generated pixel for the interpolation. When the first determination unit 15 determines that an inputted image pattern fits one of the prepared patterns, the outline shape of an input picture is determined to correspond to the fitted fixed pattern.

The comparison values in FIG. 7 denote a fixed pattern to compare a 2-bit edge detection result with 3-bit comparison values. The first determination unit 15 follows the following determinations (a) to (h) to determine whether or not the edge detection result for the respective pixels fits the comparison values.

(a) A comparison value of 0 describes "truth" even when a 2-bit edge detection result has any values.

(b) A comparison value of 1 describes "truth" when a 2-bit edge detection result has 0 (a large positive value).

(c) A comparison value of 2 describes "truth" when a 2-bit edge detection result has 3 (a large negative value).

(d) A comparison value of 3 describes "truth" unless a 2-bit edge detection result has 0.

(e) A comparison value of 4 describes "truth" unless a 2-bit edge detection result has 3.

(f) A comparison value of 5 describes "truth" when a 2-bit edge detection result has 0 or 1 (positive value).

(g) A comparison value of 6 describes "truth" when a 2-bit edge detection result has 2 or 3 (negative value).

(h) A comparison value of 7 describes "not truth" independently of a 2-bit edge detection result.

Since a plurality of edge detection results for the respective pixels may be sometimes determined to be "truth", an input image fits a plurarity of fixed patterns.

Figure 8:
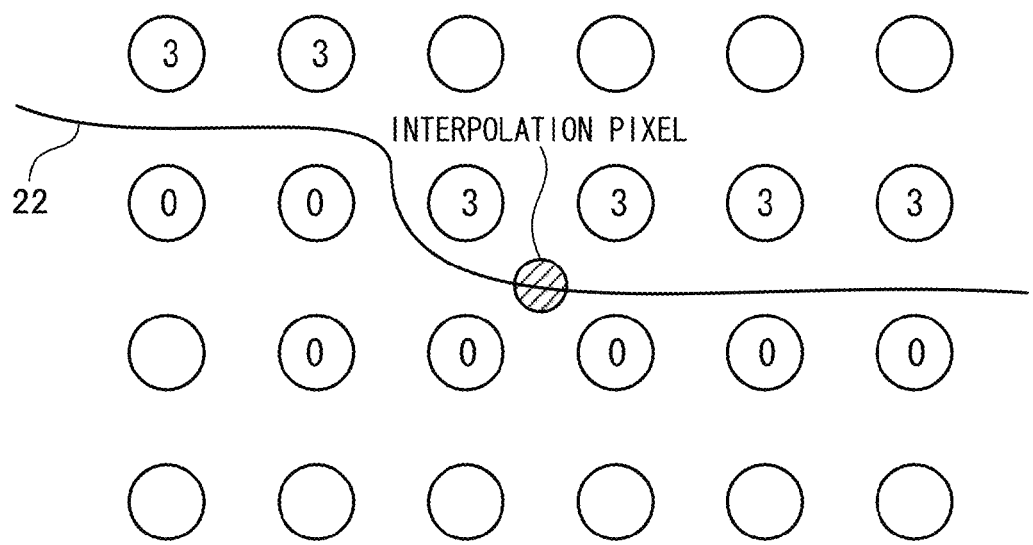
FIG. 8 is a view showing an example of 4-valued data.

FIG. 8 is a view showing an example of 4-valued data. FIG. 8 shows a 2-bit edge detection result corresponding to an image with an outline shape denoted by a solid line 22, the circles denoting pixels, the numbers inside the circles denoting 2-bit edge detection results determined for the respective pixels.

A candidate of the interpolation direction for the interpolation pixel denoted by a diagonal line at FIG. 8 is determined. The numbers inside the circles in FIG. 8 are edge detection results output from the multi-valued processing unit 13. The first determination unit 15 compares the edge detection result in the range having the number of pixels, which are arranged around an interpolation pixel are as same as a fixed pattern, with the comparison values of the fixed pattern.

Comparison values of 0 in FIG. 7 are determined to be "truth" independently of 2-bit edge detection results, as mentioned at (a). Setting pixels comparatively distant from the edge to a comparison value of 0 enables it to have no influence on the determination at the boundary of the outline shape, for example.

As mentioned at (b), comparison values of 1 in FIG. 7 are determined to be "truth" when the 2-bit edge detection result has 0. As is clear from a comparison of the pixels at the same locations in FIGS. 7 and 8 with each other, all the pixels with comparison values of 1 have an edge detection result of 0, being determined to be "truth." As mentioned at (c), comparison values of 2 in FIG. 7 are determined to be "truth" when the 2-bit edge detection result has 3. As is clear from a comparison of the pixels at the same locations in FIGS. 7 and 8 with each other, all the pixels with comparison values of 2 have an edge detection result of 2, being determined to be "truth."

All 6×4 pixels of the fixed pattern in FIG. 7 are determined to be "truth." The first determination unit 15, therefore, determines that the fixed pattern in FIG. 7 fits the input image of FIG. 8. The line direction connecting PIXEL A with PIXEL B in FIG. 7 is determined as a candidate of the interpolation direction. The first determination unit 15 compares all the fixed patterns with an input image to determine the candidate of the interpolation direction by detecting a fixed pattern fitted to the input image.

Although the example shown in FIG. 7 shows that the range of the pixel number of the fixed pattern contains 6×4 pixels, the range is not limited to the example in FIG. 7. As the range of the pixel number becomes larger, the fixed pattern corresponding to a smaller angle in the horizontal or vertical direction of a diagonal outline shape can be prepared.

The determinations (a) to (h) are to compare the 4-valued edge detection result with a 3-bit comparison value, and may be appropriately adjusted. When multi-valued processing excluding 4-valued processing to edge detection results is performed, the determination is redefined in accordance with the numbers of the multi-valued number of the edge detection result and the comparison value.

The interpolation directions determined by the determination unit 15 can include an inappropriate interpolation direction. An alphabet of "E" or "F" having a rectangular outline is sometimes included in an input image, for example. In such a case, a 45°-inclined diagonal direction may be determined as an interpolation direction. The interpolation processing using the 45°-inclined diagonal direction causes the intrinsically rectangular outline to be interpolated in the 45°-inclined diagonal direction. The interpolation processing can result in image degradation that the alphabet lacking edges appears on a screen.

The second determination unit 16 functions to exclude a candidate of an interpolation direction determined erroneously by the first determination unit 15. The second determination unit 16 includes a storage unit that memorizes exclusion fixed patterns to be excluded from the fixed patterns for the candidate of the interpolation direction. The second determination unit 16 reads the exclusion fixed patterns from the storage unit to determine one of the exclusion fixed patterns as well as the first determination unit 15. In other words, the second determination unit 16 compares an edge detection result for an input image with comparison values of the exclusion fixed pattern regarding each pixel to determine the exclusion fixed pattern.

Figure 9:
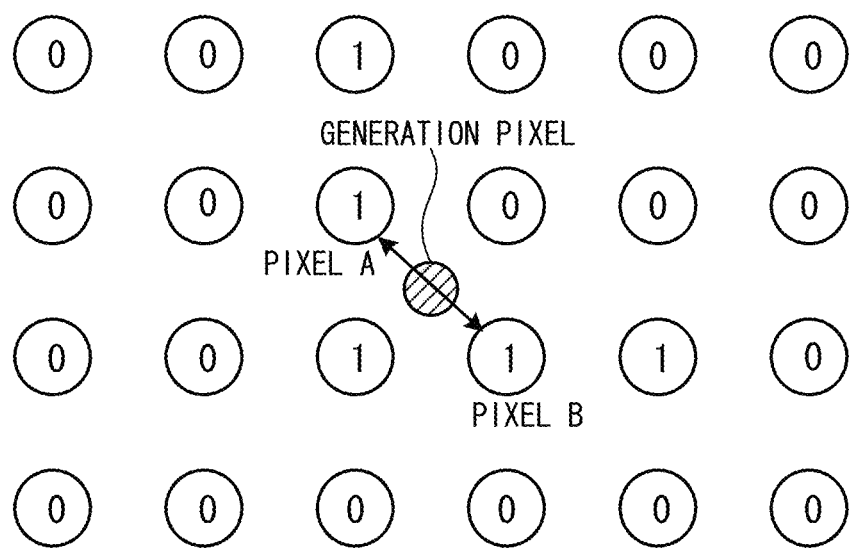
FIG. 9 is a view for explaining a second determination unit.
Figure 10:
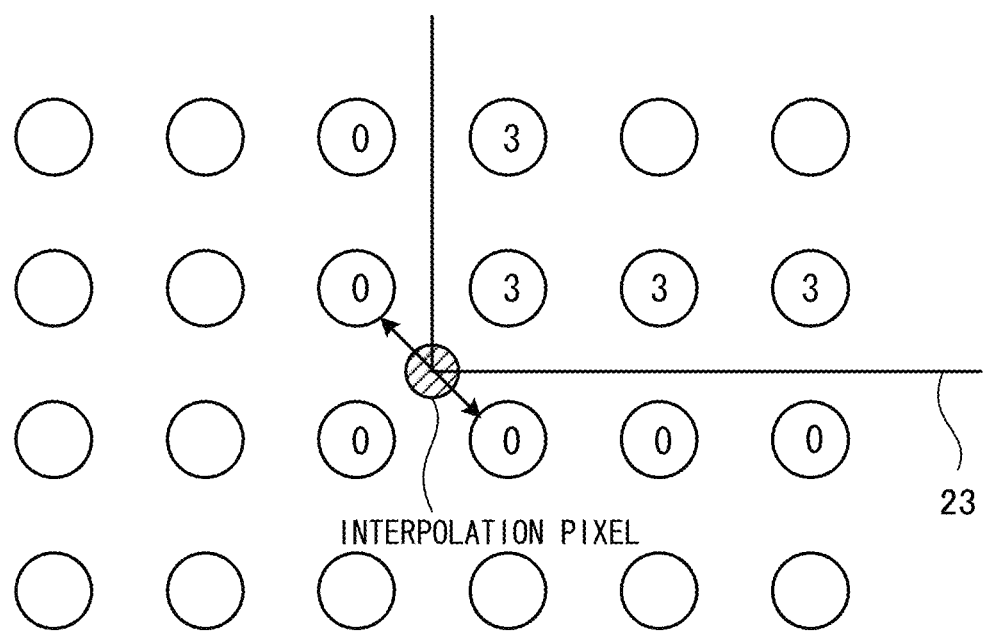
FIG. 10 is a view for explaining the second determination unit.

FIG. 9 and FIG. 10 are views for explaining the second determination unit 16. FIG. 9 is a view exemplifying a fixed pattern and an exclusion fixed pattern denoted as well as in FIG. 7. FIG. 10 is a view exemplifying an input image denoted as well as in FIG. 8.

The fixed pattern shown in FIG. 9 is assumed to be memorized in the storage unit that the first determination unit 15 accesses. The fixed pattern in FIG. 9 has an interpolation line direction connecting PIXEL A with PIXEL B to generate a generation pixel.

An input image shown in FIG. 10 is assumed to be inputted. The input image shown in FIG. 10 has a rectangular boundary of the outline as denoted by the solid line 23, for example. The rectangular boundary is a portion of an alphabet "E." The first determination unit 15 uses the above-mentioned determinations (a) to (h) to determine that the input image fits the fixed pattern shown in FIG. 9, as is clear from a comparison between FIG. 9 and FIG. 10. The interpolation processing using the interpolation direction of the fixed pattern can cause the interpolation pixel in FIG. 10 to be interpolated by the pixels diagonally next to the interpolation pixel. As a result, the interpolation processing can result in an alphabet with the edge lacked, leading to image degradation.

The storage unit accessed by the second determination unit 16 memorizes the exclusion fixed patterns to be excluded from candidates of the interpolation direction. The second determination unit 16 compares the input image with the exclusion fixed pattern to thereby determine that the interpolation direction corresponding to the fixed pattern of FIG. 9 is an exclusion interpolation direction.

The determination results from the first determination unit 15 and the second determination unit 16 are provided for the selection unit 17. The selection unit 17 receives input image data, and excludes the exclusion interpolation direction calculated by the second determination unit 16 from the candidates of the interpolation direction calculated by the first determination unit 15. Thus, the selection unit 17 selects a most appropriate direction from the remaining candidates of the interpolation direction.

For example, the selection unit 17 sets up two pixel ranges each including the respective pixels used for the interpolation by the use of the remaining candidates to calculate accumulation additional values of differences of pixel values in the two ranges. Thus, the selection unit 17 selects a candidate of the interpolation direction providing for a minimum accumulation additional value as an appropriate interpolation direction.

Figure 11:
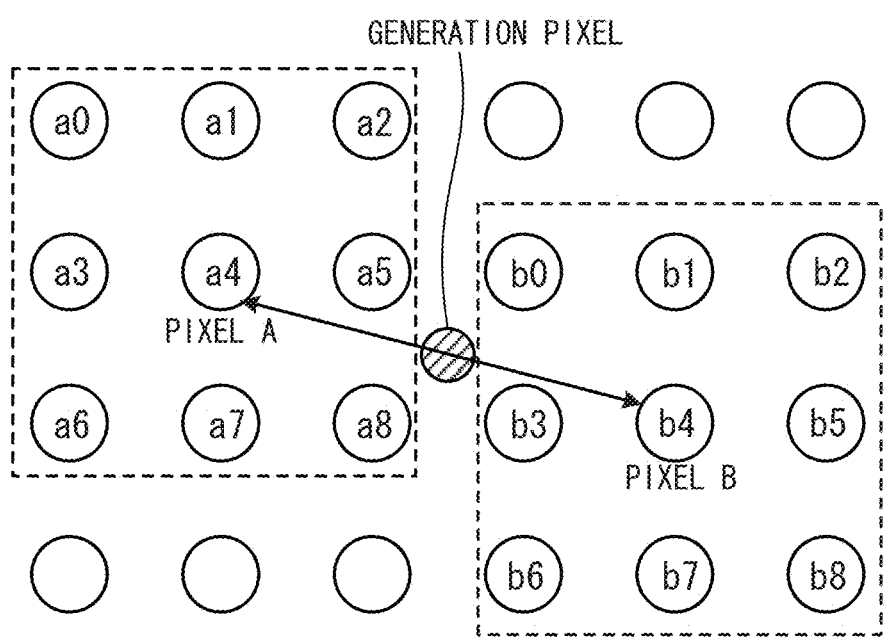
FIG. 11 is a view for explaining a selection method of a selection unit.

FIG. 11 is a view for explaining a selection method of the selection unit 17. The view of FIG. 11 shows each pixel of an input image. The numbers and codes inside the circles denote pixel values. FIG. 11 shows that a candidate of the interpolation direction for the shaded pixel (interpolation pixel) is a line connecting PIXEL A with PIXEL B, and the interpolation pixel is generated using the pixel values of PIXEL A and PIXEL B on the line.

The selection unit 17 sets up the predetermined pixel ranges ((3×3) ranges in FIG. 11) containing PIXEL A and PIXEL B used for the interpolation to determine an accumulation additional value SAD of the differential absolute value of the pixel values in each pixel range by using following equation (10). In addition, abs ( ) expresses the absolute value inside ( ). When the candidate of the interpolation direction is in accordance with the direction of the outline, the accumulation additional value SAD is likely to be small.

SAD is defined as $$SAD = abs(a0-b0) + abs(a1-b1) + abs(a2-b2) + \cdots + abs(a8-b8) \quad (10).$$

The selection unit 17 selects the candidate of interpolation direction providing for the minimum accumulation additional value SAD as an interpolation direction. The selection unit 17 outputs a selected interpolation direction to the interpolation processing unit 18. The interpolation processing unit 18 interpolates an input image using a selected pixel in the interpolation direction. For example, when the selection unit 17 provides for the interpolation direction and pixel information used for the interpolation to the interpolation processing unit 18, the interpolation processing unit 18 generates an interpolation pixel using pixels selected for the interpolation. For example, the interpolation processing unit 18 determines the average pixel value of PIXEL A and PIXEL B in FIG. 11 as an interpolation pixel value.

In addition, the candidate of the interpolation direction may not be detected, for example, when a noticeable pixel is not a portion of the outline of a pattern. In this case, the interpolation processing unit 18 performs common expansion processing with an FIR filter to the noticeable pixel having an interpolation direction that is not detected.

Figure 12:
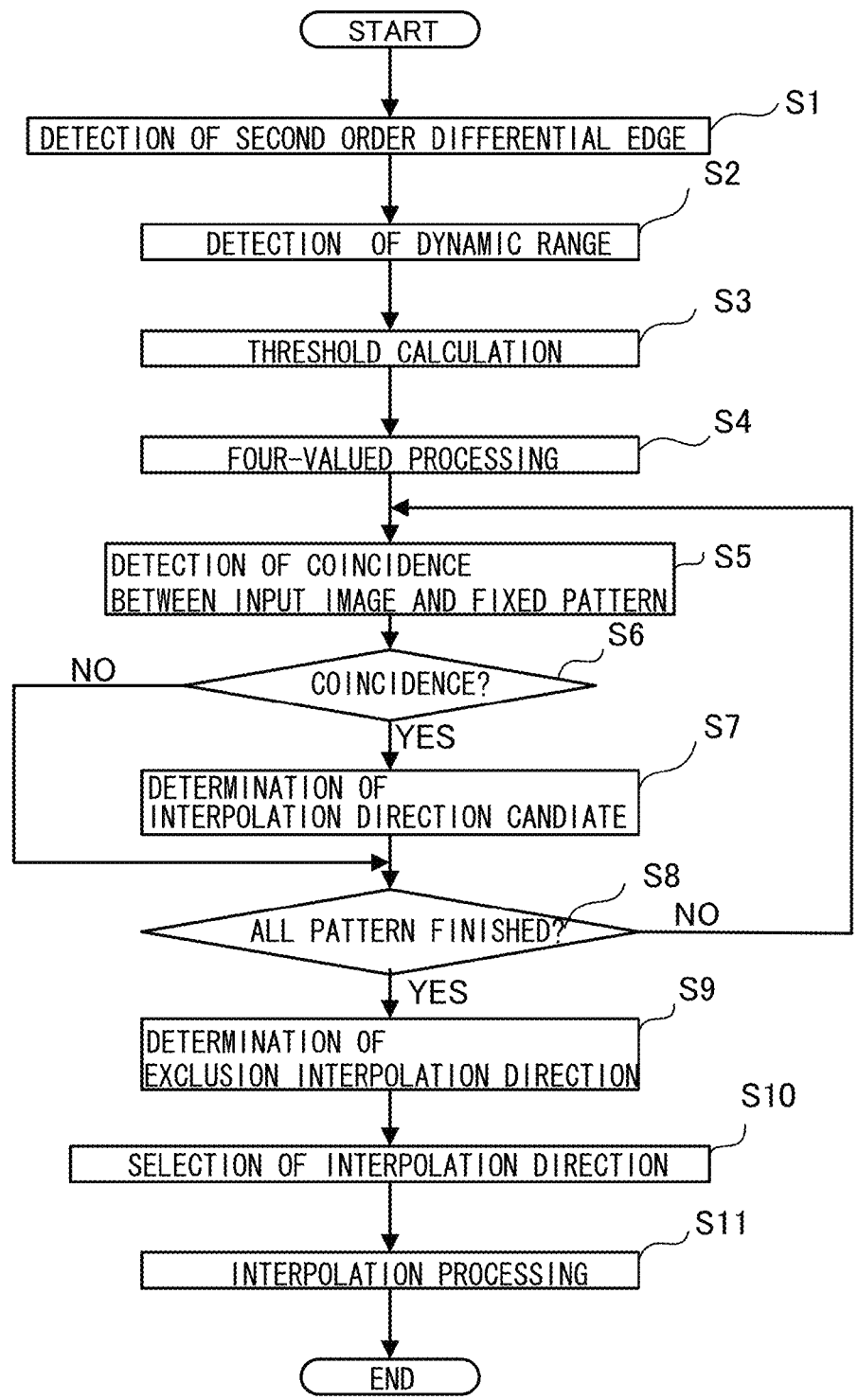
FIG. 12 is a flow chart for explaining an operation of the first embodiment.

Operation of the embodiment as configured in this way will be described with reference to FIG. 12. FIG. 12 is a view showing a flow chart for explaining the operation of the embodiment.

As shown in FIG. 12, input image data is inputted into the second order differential circuit 11 and the detection unit 12. The second order differential circuit 11 detects edges by the second order differential processing to output the detected edges to the multi-valued processing unit 13 (Step S1). The detection unit 12 detects a dynamic range of the input image data to output the dynamic range to the calculation unit 14 (Step S2).

The calculation unit 14 calculates a threshold value tht, which changes with the dynamic range, to output the threshold value tht to the multi-valued processing unit 13 (Step S3). The multi-valued processing unit 13 uses the threshold value tht to perform 4-valued processing to the edges detected by second order differential processing (Step S4). As a result, it is possible to reduce amount of throughput in later processing.

The 2-bit edge detection result from the multi-valued processing unit 13 is provided for the first determination unit 15. The first determination unit 15 determines the candidate of the interpolation direction at Steps S5 to S7. The first determination unit 15 determines whether or not the input image fits the fixed pattern. In the embodiment, the fixed pattern includes comparison values having larger multi-valued numbers than the edge detection result. The comparison values assigned to the respective pixels are employed such that a plurality of edge detection results is determined to be "truth." As a result, each determination on a pixel is more likely to be "truth", thereby enabling it to determine an outline with an unclear edge as an outline portion. The unclear edge means that a large positive value and a large negative value do not continue in the second order differential results in the same way as in natural pictures.

As a result, a plurality of interpolation directions is likely to be determined as a fitted direction in the fitting determination at Step 6. The first determination unit 15 determines that the interpolation direction fitted is a candidate of an interpolation direction (Step S7). Steps S5 to S7 are repeated until the fitting determination ends between the input image and all the fixed patterns (Step S8).

After the fitting determination ends between the input image and all the fixed patterns, the second determination unit 16 determines an exclusion interpolation direction at Step 9. The processing at Step S9 is the same processing as the processing at Steps S5 to S8. The fitting determination between the input image and all the exclusion fixed patterns determines the exclusion interpolation direction.

The information from the first determination unit 15 and the information from the second determination unit 16 are provided for the selection unit 17. The selection unit 17 excludes the exclusion interpolation direction from candidates of the interpolation direction to select a most appropriate direction from the remaining candidates of the interpolation direction (Step 10). For example, the selection unit 17 selects the interpolation direction that minimizes the accumulation additional value of differential absolute value of differences between pixel values in a predetermined range including pixels used for the interpolation.

The information on the selected interpolation direction is provided for the interpolation processing unit 18. The interpolation processing unit 18 generates an interpolation pixel by using the pixels in the interpolation direction (Step S11). Thus, the interpolation processing unit 18 outputs output-image data that has undergone the expansion processing.

Figure 13:
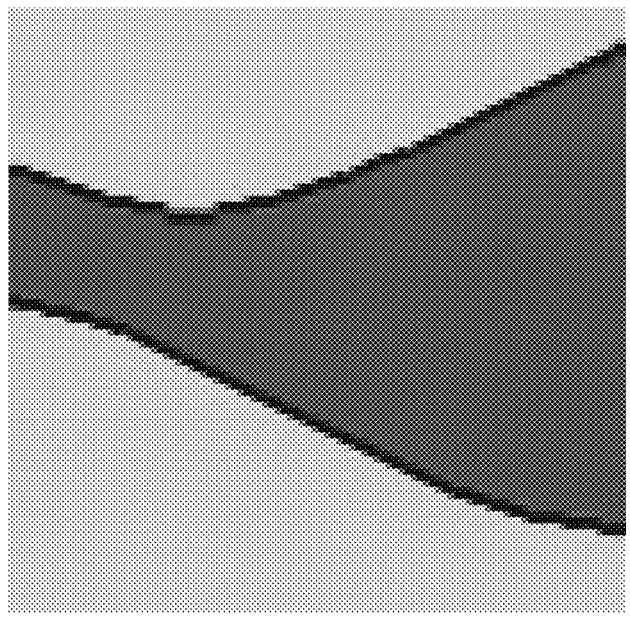
FIG. 13 is a view showing input data twice expanded in the vertical and horizontal directions.

FIG. 13 is a view showing input data twice expanded in vertical and horizontal directions. As is clear from a comparison between FIG. 13 and FIG. 5, the image expansion apparatus 10 reduces jaggy satisfactorily.

As described above, the expansion apparatus and the image expansion method according to the embodiment detect edges of an image to determine an interpolation direction used for the pixel interpolation by comparing an edge detection result with a plurality of fixed patterns corresponding to the outline shapes of the image. As a result, it is possible to determine the interpolation direction in accordance with a picture and improve image quality to reduce jaggies in expansion processing.

The multi-valued processing of an edge detection result by the predetermined number of bits achieves a reduction in the amount of the throughput for comparison with the fixed patterns. Comparing the fixed patterns by a comparison value that is more-valued than the edge detection result achieves a reduction in detection omission of the interpolation direction.

When the bit number of the edge detection result coincides with the bit number of the comparison value of the fixed pattern, increasing the bit number of the comparison value in accordance with the above-mentioned determinations gives the same result as the effect by causing the bit number of the comparison value to be larger than the bit number of the edge detection result.

Figure 14:
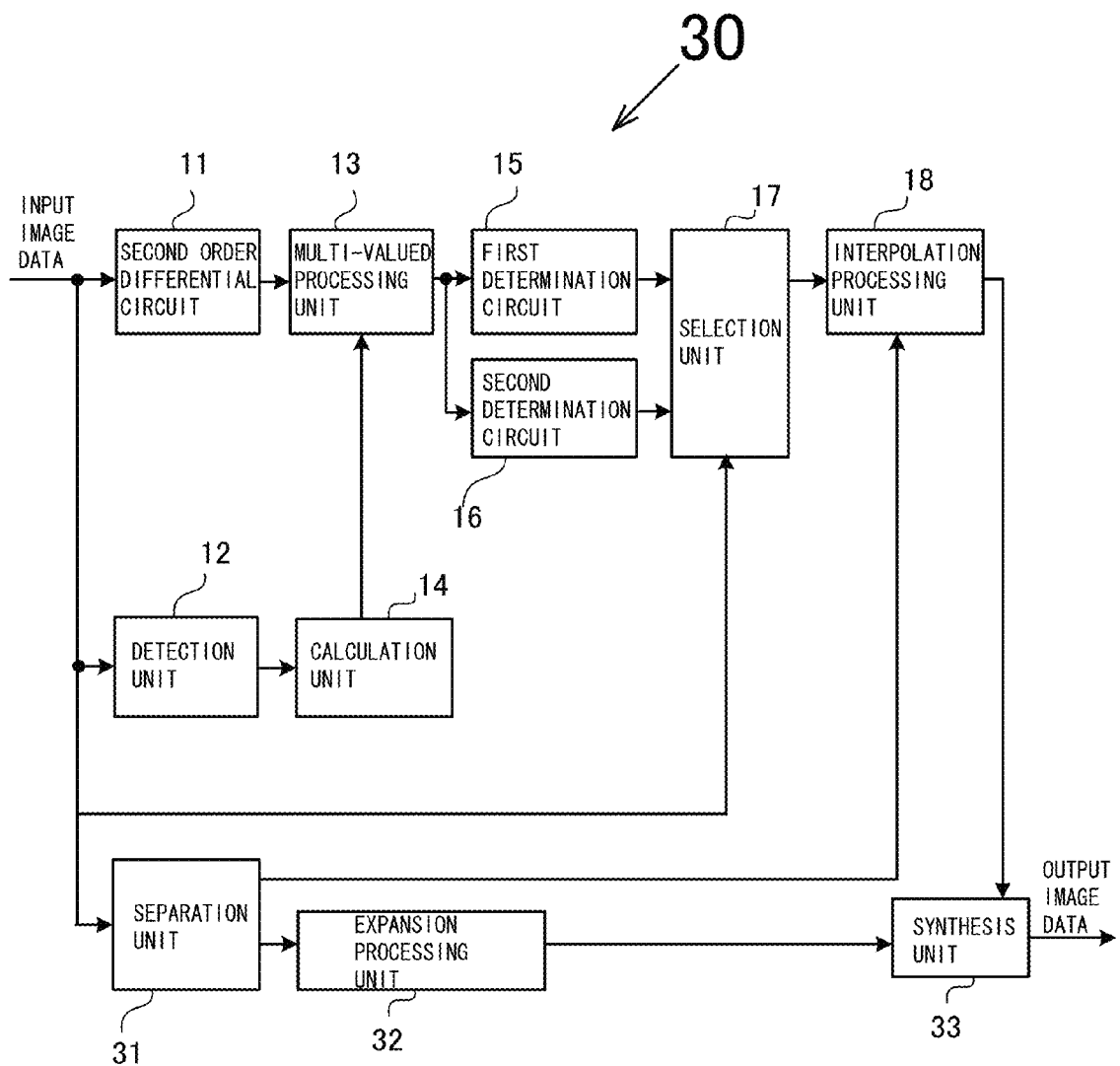
FIG. 14 is a block diagram showing an image expansion apparatus according to a second embodiment.

A second embodiment will be described with reference to drawings. FIG. 14 is a block diagram showing an image expansion apparatus. In FIG. 14, the same reference numerals denote the same or similar portions.

The first embodiment implements the interpolation processing using an interpolation direction that the selection unit 17 selects, independently of a picture. In contrast, in the embodiment, input image data is spatially separated into a low-frequency component and a high-frequency component. The selection unit 17 performs interpolation processing based on the selected interpolation direction only in the high-frequency component generated jaggies.

The second embodiment differs from the first embodiment in that an image expansion apparatus 30 of the second embodiment includes a separation unit 31, an expansion processing unit 32, and a synthesis unit 33. The separation unit 31 separates an input image data into a low-frequency component and a high-frequency component to input the high-frequency component into the interpolation processing unit 18 and the low-frequency component into the expansion processing unit 32, respectively.

The expansion processing unit 32 includes an FIR filter, or the like, and generates an interpolation pixel by using pixels around the interpolation pixel to input the interpolation pixel into the synthesis unit 33. The interpolation processing unit 18 performs the same interpolation processing as well as the interpolation processing unit 18 of FIG. 1 described in the first embodiment. The synthesis unit 33 synthesizes an interpolated high-frequency image from the interpolation processing unit 18 and an interpolated low-frequency image from the expansion processing unit 32 to output the synthesized image as image data.

In the second embodiment, the high-frequency component and the low-frequency component undergo expansion processing differently from each other. The expansion processing unit 32 performs interpolation processing using peripheral pixels with an FIR filter, or the like, to expand the low-frequency component.

Meanwhile, the high-frequency component is expanded by the interpolation processing unit 18 as well as in the first embodiment. Jaggies easily occur at the high-frequency component that has been expanded in the background art. By contrast, the embodiment detects the interpolation direction in accordance with the outline to generate an interpolation pixel, therefore, it is possible to reduce jaggies.

Thus, the embodiment performs different interpolation processing to the low-frequency component and the high-frequency component. When sufficient fixed patterns have not been prepared and when some outlines are not detected by comparing the patterns of the outlines with the fixed patterns, it is possible to perform expansion processing to have sufficient image quality at the low-frequency component. As a result, jaggies are prevented so that sufficient image quality is achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image expansion apparatus, comprising:
a second order differential circuit configured to spatially perform second order differential processing to input image data;
a multi-valued processing unit configured to perform multi-valued processing in which output data of the second order differential circuit is converted to a value from among a plurality of values;
a first determination unit configured to (i) compare respectively a plurality of fixed patterns, each of which is assigned with an interpolation direction in accordance with an outline shape of an image, with spatial dispersion of an output of the multi-valued processing unit, (ii) determine a fixed pattern corresponding to the output from the multi-valued processing unit, and (iii) determine an interpolation direction assigned to the fixed pattern as a candidate of an interpolation direction for the outline shape;
a selection unit configured to select an interpolation direction from among a plurality of candidates of the interpolation direction for the outline shape; and
an interpolation processing unit configured to receive the input image data, and configured to generate an interpolation pixel to determine a pixel for interpolation based on the interpolation direction selected by the selection unit.

2. The apparatus according to claim 1, wherein the second order differential circuit uses a second order differential value in at least one of horizontal, vertical, diagonal up-right, and diagonal up-left directions to detect an edge of the image.

3. The apparatus according to claim 1, further comprising:
a detection unit configured to receive the input image data and to detect a difference between a maximum pixel value and a minimum pixel value around a pixel as a dynamic range; and
a calculation unit configured to calculate a multi-valued threshold value in accordance with the dynamic range and to output the multi-valued threshold value to the multi-valued processing unit.

4. The apparatus according to claim 1, further comprising:
a separation unit configured to spatially separate the input image data into a low-frequency component and a high-frequency component to provide the high-frequency component as a substitute for the input image data into the interpolation processing unit;
an expansion processing unit configured to expand the low-frequency component; and
a synthesis unit configured to synthesize an output of the interpolation processing unit and an output of the expansion processing unit.

5. The apparatus according to claim 4, wherein the expansion processing unit is an FIR filter.

6. The apparatus according to claim 1, wherein the multi-valued processing unit uses a predetermined threshold value to convert the output data of the second order differential circuit to an integer value from 0 to (n−1), where n is an integer greater than or equal to 2.

7. The apparatus according to claim 6, wherein the multi-valued processing unit uses a value proportional to an absolute value of a difference between a maximum pixel value and a minimum pixel value of pixels around a noticeable pixel as the predetermined threshold value.

8. The apparatus according to claim 1, further comprising:
a second determination unit configured to (i) compare respectively a plurality of exclusion fixed patterns, each of which is assigned with an interpolation direction in accordance with the outline shape of the image, with spatial dispersion of the output of the multi-valued processing unit, (ii) determine an exclusion fixed pattern corresponding to the output from the multi-valued processing unit, and (iii) output the exclusion fixed pattern to the selection unit,
wherein an interpolation direction assigned to the exclusion fixed pattern is excluded from the candidates of the interpolation direction.

9. The apparatus according to claim 8, wherein the interpolation direction is selected from the candidates based on an accumulation additional value of differential absolute value of pixel values over two pixel ranges individually including two pixels used for the interpolation.

10. The apparatus according to claim 1, further comprising a storage unit configured to memorize the fixed patterns.

11. An image expansion method, comprising:
spatially performing second order differential processing to input image data;
performing multi-valued processing to an output acquired by the second order differential processing;
comparing respectively a plurality of fixed patterns, each of which is assigned with an interpolation direction in accordance with an outline shape of an image, with spatial dispersion of an output of a multi-valued processing unit which performs the multi-valued processing, determining a fixed pattern corresponding to the output from the multi-valued processing unit, and determining an interpolation direction assigned to the fixed pattern as a candidate of an interpolation direction for the outline shape;
selecting an interpolation direction from a plurality of candidates of the interpolation direction for the outline shape; and receiving the input image data and generating an interpolation pixel to determine a pixel for interpolation based on the selected interpolation direction.

12. The method according to claim 11, further comprising using a second order differential value in at least one of horizontal, vertical, diagonal up-right, and diagonal up-left directions to detect an edge of the image.

13. The method according to claim 11, further comprising:
detecting a dynamic range of the image; and
calculating a threshold value corresponding to the dynamic range,
wherein the multi-valued processing is performed by using the threshold value.

14. The method according to claim 11, further comprising:
spatially separating the input image data into a low-frequency component and a high-frequency component to generate a generation pixel based on the selected interpolation direction for the high-frequency component as a substitute for the input image data;
expanding the low-frequency component; and
synthesizing the interpolation pixel and an output expanded of the expanding the low-frequency component.

15. The method according to claim 14, wherein the expansion processing employs a FIR filter.

16. The method according to claim 11, wherein the multi-valued processing is 4-valued processing.

17. The method according to claim 16, further comprising:
using a value proportional to an absolute value of a difference between a maximum pixel value and a minimum pixel value of pixels around a noticeable pixel as a predetermined threshold value; and
performing the 4-valued processing to the output acquired by the second order differential processing by using the predetermined threshold value.

18. The method according to claim 11, further comprising:
comparing respectively a plurality of exclusion fixed patterns, each of which is assigned with an interpolation direction in accordance with the outline shape of the image, with spatial dispersion of the output of the multi-valued processing unit;
determining an exclusion fixed pattern corresponding to the output from the multi-valued processing unit; and
excluding an interpolation direction assigned to the exclusion fixed pattern from the candidates of the interpolation direction.

19. The method according to claim 11, wherein the interpolation direction is selected from the candidates based on an accumulation additional value of differential absolute value of pixel values over two pixel ranges individually including two pixels used for the interpolation.

* * * * *